Aug. 3, 1954  F. E. WILEY  2,685,639
TRUCK MARKER LAMP
Filed May 20, 1952

INVENTOR,
Fred E. Wiley,
BY Chapin & Neal
ATTORNEYS

Patented Aug. 3, 1954

2,685,639

UNITED STATES PATENT OFFICE 2,685,639

TRUCK MARKER LAMP

Fred E. Wiley, Norwood, Ohio, assignor to The Grote Manufacturing Co., Inc., Bellevue, Ky., a corporation of Kentucky Application May 20, 1952, Serial No. 288,809

3 Claims. (Cl. 240—8.3)

This invention relates to a lamp which is permanently secured to the rear, or other portion of a truck to warn traffic of the presence of the truck when the latter is halted at night, on the road or at the roadside.

The principal object of the invention is to provide an improved means for retaining the lens cover in place so as to permit bulb replacement or other servicing of the lamp without the use of tools.

Other and further objects and advantages will be made apparent in the following specification and claims and in the disclosure of the accompanying drawing.

Figure 1:
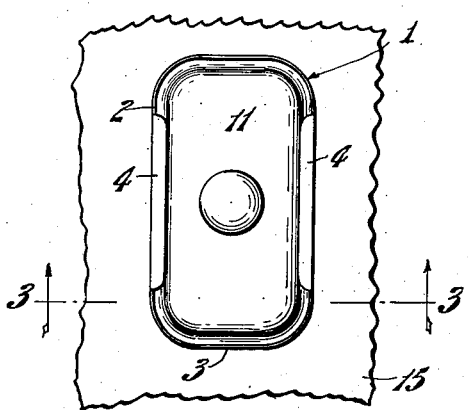
Fig. 1 is an elevation of a lamp embodying the invention.

Referring to the drawings, the device is shown as comprising a generally rectangular base member 1 having side and end walls 2 and 3 respectively, the side walls being provided with inwardly extending flanges 4.

An electric lamp structure 5 of suitable construction and including a conventional light bulb 6 is mounted on the base member 1 by a bracket 7, the usual electrical lead being shown at 8. Lead 8 will include a ground wire when the device is applied to a wooden truck body. When applied to a metal truck body the ground connection is provided through bracket 7, base 1, and the mounting screws. A gasket member 9 formed from a sheet of rubber or other similar resilient material extends over the base member 1 from wall to wall, the sheet being apertured at 10 to accommodate the lamp structure.

Figure 3:
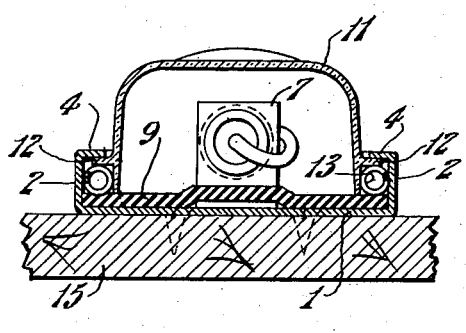
Fig. 3 is a sectional view substantially on line 3—3 of Fig. 1.

The lamp structure is enclosed between the base member 1 and a domed cover or lens member 11, formed of transparent glass or plastic, usually red in color. The cover 11 is of less width than the distance between the free edges of the flanges 4 and is provided with outwardly extending webs 12 which are adapted to engage partway beneath the flanges when the cover is substantially centered between the side walls 2 as shown in Fig. 3. When the webs 12 are engaged beneath flanges 4 the edges of the cover make a pressure, weathertight sealing engagement with the gasket 9 to prevent entrance of moisture and dust.

Figure 2:
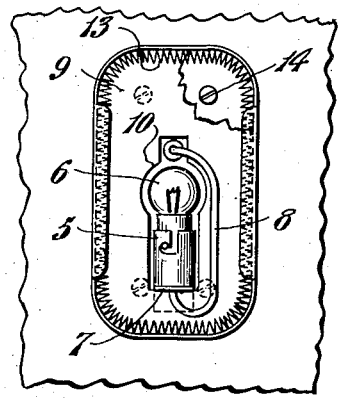
Fig. 2 is a view similar to Fig. 1 but with the lens cover removed.
Figure 4:
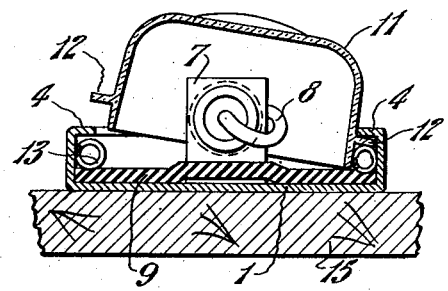
Fig. 4 is a view similar to Fig. 3 but showing the lens cover partly released.

Positioned between the walls of the base member and the edge portion of the cover below the webs 4 is an endless, resilient retaining member 13 which as shown in Figs. 2, 3 and 4 comprises a coiled spring. The member 13 maintains the cover centered between the walls 2 but is yieldable to sidewise pressure as shown in Fig. 4 to permit the opposite web 12 to clear the adjacent flange 4 so that the cover 11 may be swung upwardly, as shown, and removed to permit replacement of the light bulb 6 or for other servicing.

The base member 1 may be secured by bolts or screws 14 to the body of a truck, a fragment of which is indicated at 15.

Figure 5:
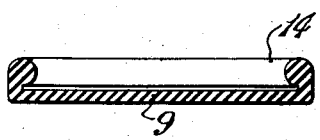
Fig. 5 is a detail view of a modified gasket and retaining member.

If desired the spring retainer 13 may be replaced by an endless rubber member 14, Fig. 5, which, as shown, may be formed integral with the gasket member 9.

As will be apparent the structure of the invention provides a simple economically produced truck marker in which the lamp structure is positioned in a sealed, weatherproof enclosure and which permits removal of the cover or lens without the use of any tools.

What is claimed is:

1. In a truck marker light, a base member having side walls, opposed portions of said side walls having inwardly directed flanges, a transparent dome-shaped cover member of less width than the distance between the free edges of said side wall flanges, the cover member having opposed webs extending outwardly from opposite sides thereof and severally engageable partway beneath said side wall flanges when the cover is centered between said side walls of the base member, a lamp structure mounted on the base member to be enclosed by the cover and base member, a resilient gasket member between the cover and the base member, the edges of the cover making a sealing engagement with the gasket when the said cover side webs are engaged beneath the said side wall flanges, and a resilient retaining member surrounding the edge portions of the cover for yielding engagement therewith and with said portions and with the walls of the base member to normally maintain the cover centered between the walls of the base member, the retaining member being yieldable to sidewise pressure to permit said cover web opposite the direction of yielding of the retaining member to clear said side wall flange adjacent thereto to permit removal of the cover.

2. In a truck marker light a generally rectangular base member having side and end walls and having flanges extending inwardly from said side walls, a transparent domed cover of less width than the distance between the free edges of said side wall flanges, the cover having opposed webs extending outwardly from opposite sides thereof and engageable partway beneath said side wall flanges when the cover is centered between said base side walls, a lamp structure mounted on the base member to be enclosed by the latter and the cover, a resilient gasket member extending from wall to wall of the base member, the edges of the cover making a sealing engagement with the gasket when the said cover webs are engaged beneath said base side wall flanges, and an endless resilient retaining member positioned between the walls of the base member and the portion of the cover below the webs, the retaining member yieldingly engaging said base walls and cover to normally maintain the latter centered between said base walls, the retaining member yielding to sidewise pressure to permit the opposite cover web to clear the flange adjacent thereto to permit removal of the cover.

3. In a truck marker light as set forth in claim 2 the gasket member and the retaining member being unitary.

References Cited in the file of this patent

UNITED STATES PATENTS

| Number | Name | Date |
|---|---|---|
| 832,924 | Ross | Oct. 9, 1906 |
| 2,092,989 | Sorensen | Sept. 14, 1937 |
| 2,202,315 | Langdon | May 28, 1940 |
| 2,269,182 | Claspy | Jan. 6, 1942 |